L. MELANOWSKI.
POWER TRANSMITTING MECHANISM.
APPLICATION FILED AUG. 21, 1916.

1,342,687.

Patented June 8, 1920.
5 SHEETS—SHEET 4.

Inventor:
Leo Melanowski,
by Edward R. Alexander
his Attorney

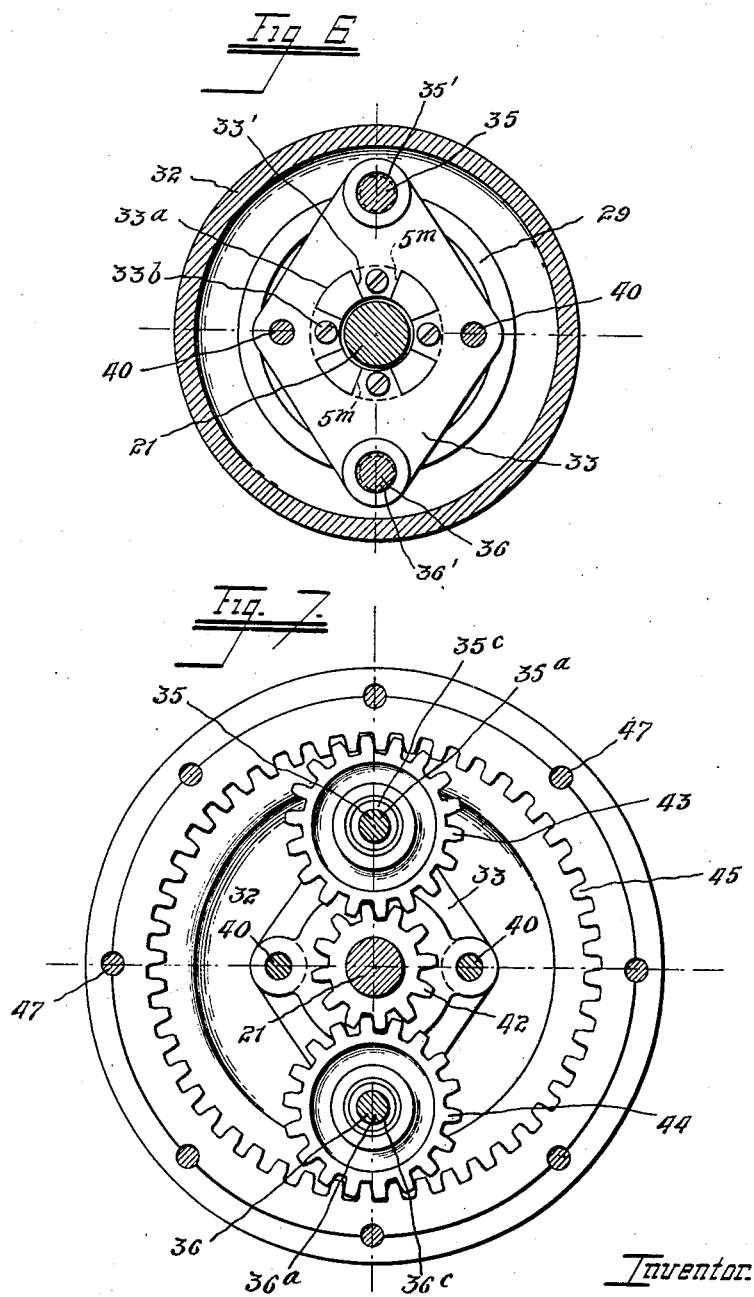

UNITED STATES PATENT OFFICE.

LEO MELANOWSKI, OF CLEVELAND, OHIO, ASSIGNOR TO THE CITIZENS SAVINGS AND TRUST COMPANY, OPERATING TRUSTEE, OF CLEVELAND, OHIO, A CORPORATION OF OHIO.

POWER-TRANSMITTING MECHANISM.

1,342,687.     Specification of Letters Patent.     Patented June 8, 1920.

Application filed August 21, 1916. Serial No. 115,927.

*To all whom it may concern:*

Be it known that I, LEO MELANOWSKI, a citizen of the Republic of France, residing at Cleveland, in the county of Cuyahoga and State of Ohio, have invented certain new and useful Improvements in and relating to Power-Transmitting Mechanism, of which the following is a specification.

This invention relates to power transmitting mechanism particularly for motor or auto vehicles. I have had in mind to produce a more efficient, economical and durable final drive for relatively heavy traction requirements than any of those now in general use, for example on various types of so-called commercial motor cars and tractors.

One of the objects of my invention has been to devise a power transmitting construction of this general character in which all of the power transmitting parts in the structure where the final drive is effected, including gear reduction at the traction wheels themselves may at all times be run in a suitable lubricant so as to insure long life to the gearing, quiet running and a minimum amount of attention in operation.

Another object of my invention has been to obtain a relatively large gear reduction for the final drive at the traction wheels themselves in such manner that the gearing readily and economically may be incased so as to exclude therefrom dirt, dust and foreign materials.

Another object of my invention has been to provide relatively large driving gear surfaces between the driving parts of my improved axle mechanism and the driven gears which are secured directly to the traction wheels, so as to insure minimum wear and tear on these parts.

Another object of my invention has been by simple and durable mechanism to provide a relatively balanced application of power to the driven gear wheel on the traction wheel, about the axis around which the traction wheel turns.

Another object of my invention has been to provide an axle mechanism in which a relatively small and inexpensive differential mechanism or its equivalent may be employed, suitably mounted to transmit power to driven shafts, the axes of which are coincident with the axes of the traction wheels themselves, the supporting structure being relatively simple and compact and consisting of but relatively few parts, and the final gear reduction being made at the hubs of the wheels themselves.

Other objects of my invention will be readily understood from the following description of one type of power transmitting mechanism embodying it, which I have herein selected purely for the purpose of illustration.

Figure 1 is a top plan view of a part of a chassis of a motor vehicle, provided with correlated elements embodying my invention.

Fig. 1$^a$ is a sectional detail view of the front universal joint and its support.

Fig. 6 is a section on the line 6—6 of Fig. 3.

Fig. 7 is a section on the line 7—7 of Fig. 3.

Figure 1:
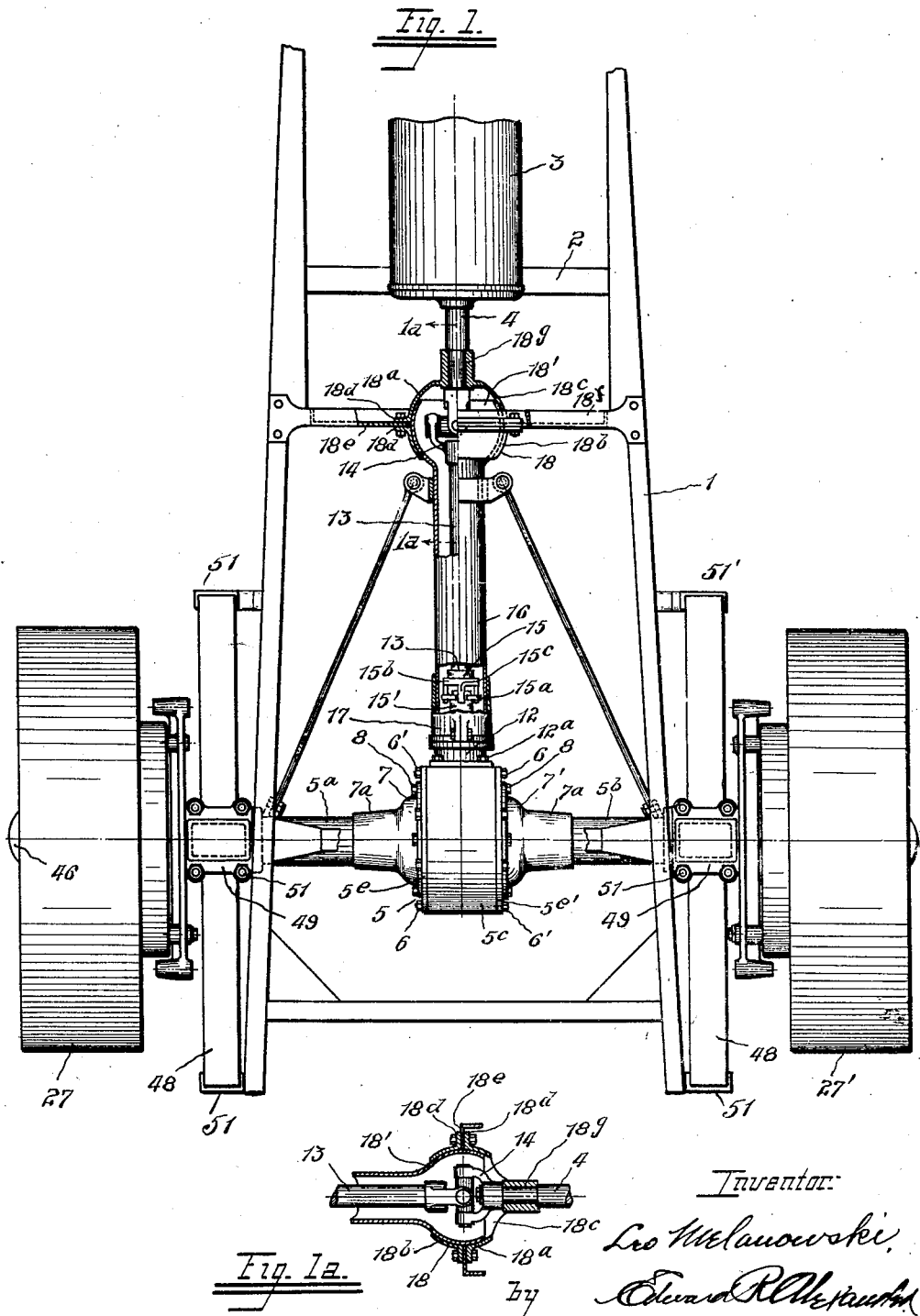
Figure 2:
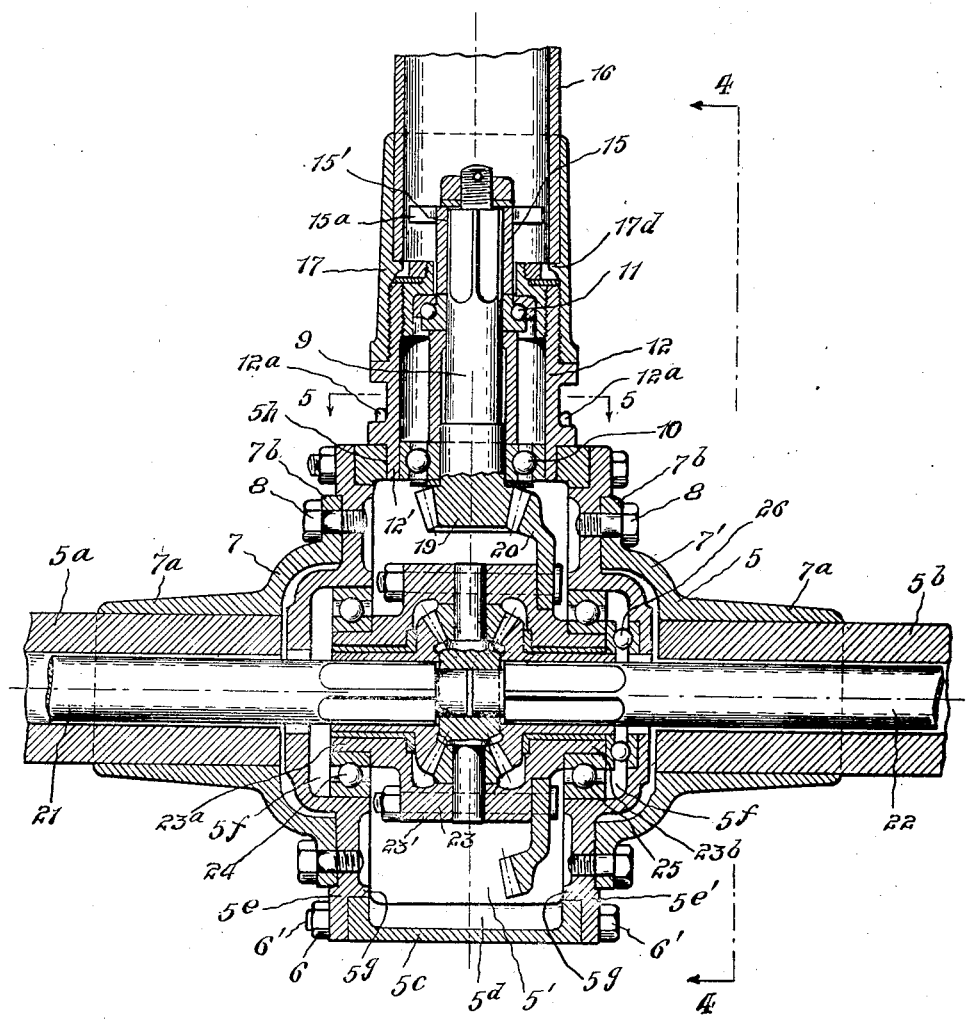
Fig. 2 is a sectional view of a portion of the rear axle mechanism on the horizontal plane containing the axes of the propeller and driven shafts.

In the drawing, 1 represents a suitable frame structure. It may be of any desired construction. 2 is a cross member of said frame structure which assists in supporting a gear casing 3 of any well known construction and from which extends a power driven shaft 4. 5 represents a housing for the rear axle structure. It may be constructed in any suitable manner so as to comprise a central enlarged hollow section 5′ from which extend laterally alined tubular extensions 5$^a$, 5$^b$. The rear axle housing illustrated has a cylinder 5$^c$ with transverse, internally projecting ribs 5$^d$ and may be a casting of any suitable material such as cast iron or metallic alloy of aluminum. 5$^e$, 5$^{e\prime}$, are side plates, each recessed as indicated at 5$^f$ and each having an inwardly turned, annular boss 5$^g$ to receive the adjacent inner wall of the cylinder 5$^c$. I prefer to connect the side plates 5$^e$, 5$^{e\prime}$, and cylinder 5$^c$ together by means of nuts 6 and bolts 6' which latter extend through the side plates and suitable passageways through the ribs 5ᵈ.

The inner ends of the tubes 5ᵃ, 5ᵇ, may be secured to the adjacent side plates 5ᵉ, 5ᵉ', respectively, in any suitable manner. For this purpose I have shown connecting pieces 7, 7', each of which has a tubular section 7ᵃ to receive the inner end of the tube 5ᵃ or 5ᵇ, as the case may be, and a flange 7ᵇ which may be secured to the adjacent side plate by means of bolts or cap screws 8.

9 is a propeller shaft suitably mounted in antifriction bearings 10, 11, which are carried by a horn or forwardly extending tube 12, which at its rear end is reduced in diameter as indicated at 12' and fitted into the walls of an opening 5ʰ through the front of the cylinder 5ᶜ. This tube 12 may be secured to the cylinder 5ᶜ in any well known manner as by means of cap screws 12ᵃ. 13 is a driving shaft preferably connected by means of a universal joint 14 to the rear end of the shaft 4 and by a driving clutch or connection 15, of any well known construction, to the squared front end of the propeller shaft 9. For this purpose I have shown a two-part coupling, the rear part 15' of which has a squared opening through it to receive the squared front end of the propeller shaft 9 and has a notched flange 15ᵃ and the front part 15ᵇ of the coupling is rigidly secured to the rear end of the shaft 13 and has a plurality of clutch jaws 15ᶜ, each of which enters one of the corresponding notches in the clutch plate 15ᵃ. This construction provides for the necessary come and go or telescoping of the clutch parts to accommodate the mechanism to various conditions which have to be met with in operation. 16 is a combined torque and thrust member which at its rear end may be connected in any well known manner to the tube or horn 12. This connection I have shown to be accomplished by means of a tubular connecting piece 17 having its rear end fitted by means of screw threads to the front end of the tubular section 12. The rear end of the section 17 may be longitudinally split and provided with ears 17ᵃ and nuts and bolts 17ᵇ for clamping this section to the front end of the horn 12, in the well known manner, after the screw-threaded adjustment between these parts has been effected. Intermediate its ends the section 17 has an inwardly extending flange 17ᵈ against which the rear end of the tube 16 abuts. The rear end of the tube 16 may be secured to the front end of the section 17 in any suitable manner as by brazing. The front end of the member 16 is preferably supported by a universal joint 18 which has its axis coincident with the axis of the universal joint 14. The universal joint 18 may consist of a parti-spherical shell 18' carried by and rigidly secured to the front end of the tube 16 and a parti-spherical, hollow, ball-like section 18ᵃ which may be constructed and supported from the frame in any suitable manner; for example, this section 18ᵃ may consist of two parts 18ᵇ, 18ᶜ, each having a flange 18ᵈ rigidly secured to a web 18ᵉ of a frame cross member 18ᶠ. Either or both of these parts 18ᵇ, 18ᶜ, may be secured rigidly to the said web 18ᵉ of the cross member by means of bolts, if desired, so that the parts may be readily assembled or disassembled. The part 18ᶜ may be formed with a bearing 18ᵍ for the rear end of the driven shaft 4.

19 and 20 are driving and driven gears respectively, which may be of any suitable construction, the former being secured to the rear end of the propeller shaft 9 and driven thereby. I have illustrated the gear 19 to be a bevel pinion and the gear 20 to be a bevel ring gear. The driven gear 20 may be mounted within the housing 5' and connected in any suitable manner with the driven shafts 21, 22, each of which latter extends at both ends through one of the tubular lateral extensions 5ᵃ, 5ᵇ, as the case may be. I have shown the driving connection between the gear 20 and the shafts 21 and 22 to be effected by means of differential mechanism 23, which also may be of any well known construction. Where such a driving connection between the driven gear 20 and driven shafts 21 and 22 is used, the gear 20 may receive its mount within the casing from the mounting for the differential housing 23'. This differential housing 23' is shown as having tubular, lateral extensions 23ᵃ and 23ᵇ, the former of which is mounted in an anti-friction bearing 24 which is in turn mounted in the recess 5ᶠ in the adjacent side plate 5ᵉ, whereas the tubular extension 23ᵇ is mounted in an anti-friction bearing 25 which is in turn mounted in the recess 5ᶠ in the adjacent side plate 5ᵉ'. 26 is an anti-friction thrust bearing interposed between the adjacent end of the tubular extension 23ᵇ, inner race of the annular bearing 25 and inner wall of the side plate 5ᵉ'. This thrust bearing serves to take the thrust on the differential housing occasioned during the operation of the bevel gearing 19, 20.

27, 27' are traction wheels, the former is mounted and is rotatable upon the outer end of the tubular extension 5ᵃ of the axle housing and the latter is mounted and is rotatable upon the outer end of the tubular extension 5ᵇ of the axle housing. The mounting of these traction wheels on the outer ends of the axle tubes 5ᵃ, 5ᵇ, respectively, is preferably accomplished by what is ordinarily called a full floating mounting, that is, each of the traction wheels has a hub section 28 which extends inwardly over the adjacent end of the axle tube with which it coöperates and is supported relative thereto and turns upon anti-friction bearings 29 and 30 carried by the tube $5^a$ or $5^b$, as the case may be, so that all of the load and thrust of each traction wheel is taken upon the axle tube on which it is mounted, and none is transmitted to the shaft which drives it. The anti-friction bearings 29 and 30 may be of any suitable construction. I have shown them to be what are ordinarily called annular ball bearings. The inner race of the bearing 30 may be seated against a shoulder $5^k$ on the supporting tube $5^a$ or $5^b$, as the case may be. 31 is a suitable spacer surrounding the supporting tube and interposed between the inner races of the bearings 29 and 30. 32 is a side plate for a gear casing which is connected to the adjacent hub 28; it is preferably formed integrally therewith.

33 is a plate or gear support, one of which is rigidly secured to the outer end of each of the tubes $5^a$, $5^b$. This connection must be accomplished in a rigid and durable manner. For the purpose I have shown the end of the supporting tube $5^a$ to be recessed, for example with dove tail recesses $5^m$, and the plate 33 to be correspondingly dove tailed and snugly fitted into the dove tail recesses $5^m$, as indicated at 33', and also having a portion extending inwardly and snugly fitted over the adjacent end of the tube, as indicated at $33^a$, and finally I have provided cap screws $33^b$ which extend through the dove tail portions of the plate 33 and are screwed into alined screw-threaded recesses in the adjacent end of the supporting tube. It will be understood that this provides an extremely rigid, strong and durable connection between the gear support 33 and the end of the adjacent supporting tube $5^a$, $5^b$, as the case may be, and also a connection which enables the operative to disassemble these parts readily whenever desired. Each plate 33 carries an inwardly turned boss $33^c$ which bears against the inner race of the adjacent anti-friction bearing 29 and serves to hold the bearings 29, 30 and spacer 31 in proper relation so that the inner race of the bearing 30 is snug against the shoulder $5^k$. 35, 36, are stud shafts, the inner ends of which are carried by the plate 33. For this purpose they may be screw-threaded as indicated at 35', 36', respectively, and fitted into correspondingly screw-threaded openings in the plate 33. To insure the permanency of this connection the inner ends of the screw-threaded sections of these stud shafts may be upset against the plate 33. 37 is a plate or gear support recessed at 37' to receive an anti-friction bearing 38 which supports the outer end of the driven shaft 21 or 22 as the case may be. The plate 37 is provided with openings $37^a$ to receive the reduced outer ends $35^a$ and $36^a$ of the shafts 35 and 36, respectively, the extreme outer ends of which may be screw-threaded as indicated at $35^b$, $36^b$, respectively. 39 are nuts for effecting proper correlation between the plate 37 and shafts 35 and 36. In order rigidly to correlate the plates or gear supports 33 and 37 relative to each other, in addition to the use of the studs 35 and 36 and nuts 39, I may provide any desired additional number of stud shafts between these plates having shoulders for engagement thereby the same as the shoulders $35^c$ and $36^c$ of the studs 35 and 36, respectively. In Figs. 6 and 7, for example, I have illustrated two such stud shafts 40. The plates 33, 37 and stud shafts or spacing shafts 35, 36 and 40 may be considered as constituting a gear cage which is rigidly and durably supported from the outer end of the adjacent axle tube $5^a$ or $5^b$, as the case may be, the principal strains and stresses on the parts constituting this gear cage as an entirety, being transmitted or taken by the axle tube $5^a$ or $5^b$, which, as the case may be, supports them rather than upon the outer end of the driven shaft which extends through this cage. Furthermore, it will be noted that the extreme outer end of each driven shaft 21, 22 has an anti-friction bearing in the outermost wall or plate constituting the cage, which bearing serves to insure that the outer end of the shaft will run true and properly support and transmit power to the gears within said cage. The outer end of each of the driving shafts 21 and 22 may be reduced in diameter and screw-threaded to receive a nut 41.

42 is a gear, one of which is formed integrally with or suitably secured to each driven shaft 21 or 22 as the case may be. It meshes with idler gears 43 and 44, the former of which is loosely mounted on the stud shaft 35, whereas the latter is loosely mounted on the stud shaft 36. Each of these idler gears 43 and 44 meshes with an internal gear 45 which is secured to the driving plate 32 on the hub in any suitable manner. I have shown this to be accomplished by means of a cap or closure plate 46 and cap screws or bolts 47.

The plates 32 and 46, body portion of the gear 45, cap screws 47 and hub 28 of the adjacent traction wheel may be considered as constituting a rigid, strong and highly durable and rotatable gear casing mounted to turn upon the outer end of the adjacent axle tube $5^a$, $5^b$, as the case may be. It will be noted that the plates 32 and 46 are oppositely dished and that the former carries a cylindrical flange into which the internal gear 45 is fitted and that said plate 32, hub 28 and the wheel spokes are integrally formed; furthermore that the combined hub and gear carrying portion of the traction wheel is compactly arranged and disposed in the vertical plane of the rim or peripheral portion of the wheel.

It will be understood that I may provide about the axis of each driven shaft as many idlers or planetary gears as circumstances and conditions warrant, having shown but two, namely, the idlers 43 and 44, in the illustrated embodiment of my invention. Furthermore, these idler gears may be mounted upon anti-friction bearings, not shown, carried by the stud shafts 35 and 36, if desired, rather than upon plain bearings, as illustrated in the drawings. Again, the internal final drive gear 45 may be of relatively larger diameter in comparison with the diameter of the traction wheel than is shown in the drawings and the gear 42, and also the idlers 43 and 44, or either of them, may be correspondingly increased in diameter to obtain the proper mesh and reduction relationships.

It will be noted that each of the driven shafts 21 and 22 is suitably mounted and supported at both its inner and outer end, on anti-friction bearings, and that its function is to transmit turning movement only from the driven gear 20 to the driven gear 45, it not being called upon to support any of the load on the traction wheel, which it drives and its correlation therewith being such that it is free from bending or shearing moments due to any action of the traction wheel encountered in ordinary operation, and free from any driving or road thrusts either inwardly or outwardly along the axis of the shaft.

It will be further noted that the construction within each traction wheel is such that all of the revolving parts, including gears, anti-friction bearings and shafts, are arranged in a substantially dust-proof structure and one in which lubricant may be retained in proper relation to the working parts substantially indefinitely, so that when these parts are assembled and properly packed with lubricant, they should operate without the necessity of further attention for many thousands of miles.

My invention lends itself to ready application with traction wheels which may be constructed of wood or any kind of metal, cast, welded, stamped or formed up in any well known manner.

Figure 3:
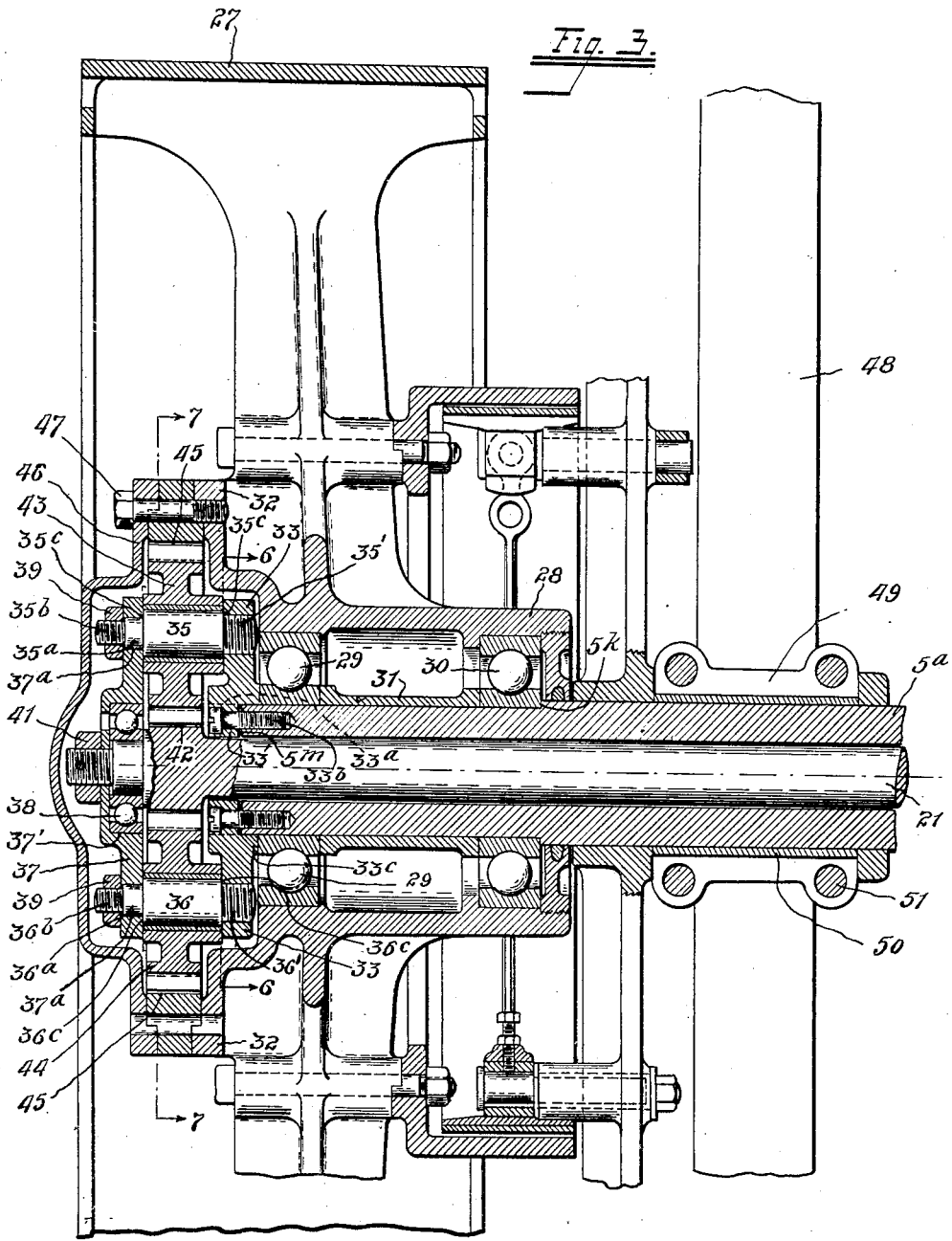
Fig. 3 is a sectional view of one wheel end of the axle taken on the horizontal plane of the axis of the driven shaft.
Figure 4:
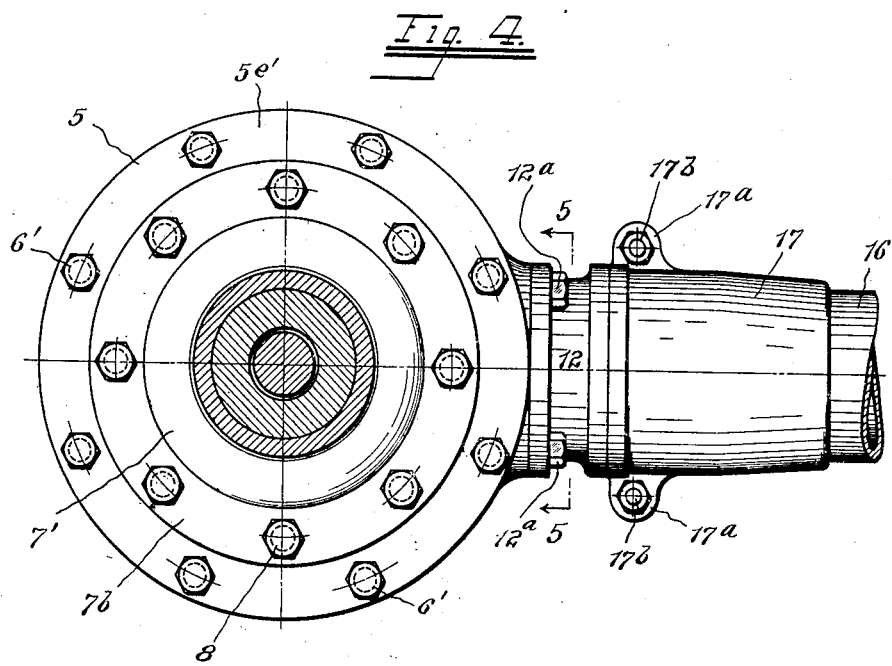
Fig. 4 is a section on the line 4—4 of Fig. 2.
Figure 5:
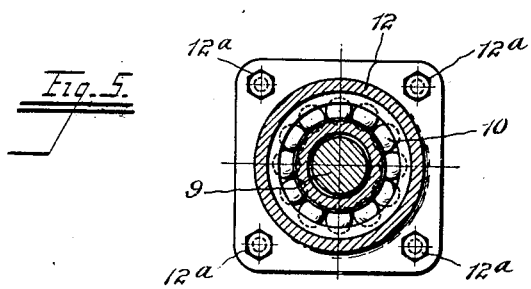
Fig. 5 is a section on the line 5—5 of Fig. 4.

I prefer to mount the rear springs 48 on the axle tubes $5^a$ and $5^b$ so that they will oscillate thereabout. Such construction I have illustrated in Figs. 1 and 3. These springs are shown to be underslung and carried by oscillatable spring seats 49, which are free to turn upon the bushings 50, each of which latter is suitably secured upon the axle tube which it surrounds. The opposite ends of each spring may be suitably shackled to the frame, as indicated at 51, in any well known manner. It will be understood that I prefer to transmit the driving thrust from the rear axle to the frame through the axle housing, thrust tube 16 and universal joint 18, rather than to drive through the springs 47, although my improvements in power transmitting mechanism proper may be adapted for use in connection with any well known form of spring suspension.

It will be noted that the lubricant tight and dust proof housing or casing for the power transmitting mechanism which is mounted concentric with the axis of the driven shafts 21, 22, may be considered as comprising a non-rotatable section consisting of the tubular members $5^a$, $5^b$ and enlarged gear receiving section $5'$ therebetween, and two rotatable sections, one mounted at the outer end of each of the tubular portions $5^a$, $5^b$ and consisting of rotatable members or sections carried by the traction wheel, such as the elements 32, 45, 46, 28 and closure $28'$ and washer $28^a$ at the inner end of each hub 28.

It will be further noted that each traction wheel hub 28 is mounted upon the outer end of the relatively stationary axle tube which extends into it and is held in proper operative relation relative thereto by the anti-friction bearings 29 and 30, the gear support 33 and cap screws $33^b$.

When it is desired merely to remove the internal driven gear 45, this may be accomplished by removing the cap screws 47 and plate 46, whereupon the gear 45 is free to be removed. Whenever it is desired to remove either a drive shaft 21 or 22, or any of the idlers 43 and 44 geared thereto, the same may be accomplished by removing the cap screws 47 and plate 46, nuts 39 and 41 and gear support 37, whereupon either of the idler gears may be removed or the driven shaft may be removed, or both, as desired.

Each driven shaft 21, 22 is held against outward movement normally by the plate 37 and its outer end is maintained in proper relation to the bearing 38 and said bearing is properly seated in its recess $37'$ in the plate 37 by the nut 41 co-acting with the screw threaded end of the driven shaft.

Each tube $5^a$, $5^b$, as the case may be, supports the traction wheel into which it extends and also the gear cage at its outer end, each entirely independently of the other, although the inner gear plate 33 serves to prevent outward axial movement of the adjacent traction wheel hub.

To those skilled in the art, many alterations in construction and widely differing embodiments and applications of my invention will suggest themselves, without departing from the spirit and scope thereof. My disclosures and the description herein are purely illustrative and are not intended to be in any sense limiting.

What I claim is:—

1. In power transmitting mechanism of the class described, the combination of a gearing housing having a reduced tubular section and two enlarged gear receiving sections connected together by said tubular section, a driven shaft extending through said tubular section from one of said gear receiving sections to the other, driving gearing for said driven shaft mounted in one of said enlarged sections, a gear secured to said driven shaft and disposed within the other of said enlarged sections, which latter section is rotatable and constitutes the hub of a traction wheel, anti-friction bearings interposed between said hub and said reduced tubular section so as to place the load strains and stresses and thrusts through said hub entirely on said tubular section, a gear cage fixed at the outer end of said tubular section and disposed within said enlarged rotatable section and nearer the outer end thereof than said bearings, a plurality of idler gears carried by said gear cage and meshing with the gear on said driven shaft, and an internal gear carried by said enlarged rotatable section and meshing with said idler gears, the mounting of said rotatable section on said tubular section being substantially dust-proof and lubricant tight.

2. In power transmitting mechanism of the class described, the combination of a gearing housing having a reduced tubular section and two enlarged gear receiving sections connected together by said tubular section, a driven shaft extending through said tubular section from one of said gear receiving sections to the other, driving gearing for said driven shaft mounted in one of said enlarged sections, a gear secured to said driven shaft and disposed within the other of said enlarged sections, which latter section is rotatable and constitutes the hub of a traction wheel, anti-friction bearings interposed between said hub and said reduced tubular section so as to place the load strains and stresses and thrusts through said hub entirely on said tubular section, a gear cage fixed at the outer end of said tubular section and disposed within said enlarged rotatable section and nearer the outer end thereof than said bearings, a plurality of idler gears carried by said gear cage and meshing with the gear on said driven shaft, an internal gear carried by said enlarged rotatable section and meshing with said idler gears, and a bearing in said cage for the outer end of said driven shaft, the mounting of said rotatable section on said tubular section being substantially dust proof and lubricant tight.

3. In power transmitting mechanism of the class described, the combination of reduction gearing, including a driving and a driven gear, an axle housing having an enlarged section within which said gears are independently supported and mounted and a tubular section extending laterally from said enlarged section, a driven shaft connected at its inner end to said driven gear and extending from said enlarged section through said tubular section and beyond the outer end of the latter, a traction wheel having a hub with a gear receiving casing, anti-friction bearings for the mounting of said hub thereon and disposed near the outer end of said tubular section, a gear carrying element disposed within said casing and rigidly secured to the outer end of said tubular section nearer the end thereof than said bearings thereon and serving to hold the adjacent wheel hub against outward axial movement, and reduction gearing disposed in said hub and comprising intermeshing gear elements carried by said hub, gear carrying element and the outer end of said driven shaft.

4. In power transmitting mechanism of the class described, the combination of reduction gearing including a driving and a driven gear, an axle housing having an enlarged section within which said gears are independently supported and mounted, a tubular section extending laterally from said enlarged section, a driven shaft connected at its inner end to said driven gear and extending from said enlarged section through said tubular section and beyond the outer end of the latter, a traction wheel having a hub with a gear receiving casing, anti-friction bearings for the mounting of said hub thereon and disposed near the outer end of said tubular section, a gear carrying element disposed within said casing and rigidly secured to the outer end of said tubular section nearer the end thereof than said bearings thereon and serving to hold the adjacent wheel hub against outward axial movement, and reduction gearing including an internal gear, a plurality of spur pinions and a driving pinion interposed between said wheel hub, said gear carrying element and the outer end of the driven shaft.

5. In power transmitting mechanism of the class described, the combination of a gearing housing having a reduced tubular section and two enlarged gear receiving sections, one arranged at either end of said tubular section, a driven shaft extending through said tubular section from one of said gear receiving sections to the other, reduction driving gearing for said driven shaft mounted in one of said enlarged sections, the other of said enlarged sections being rotatable with respect to said tubular section and constituting the hub portion of a traction wheel, anti-friction bearings interposed between said hub portion and said tubular section so as to place the load strains and stresses entirely on said tubular section, means removably secured to the outer end of said tubular section for preventing the outward movement of said hub and antifriction bearings with respect to said tubular section, and reduction gearing disposed in said enlarged rotatable gear receiving section for transmitting power from the outer end of said driven shaft to said hub portion, the mounting of said rotatable section on said tubular section being substantially dust-proof and lubricant tight and permitting the flow of lubricant between said enlarged sections.

6. In power transmitting mechanism of the class described, a traction wheel having a peripheral portion, an enlarged gear receiving hub portion at its center and in the plane of said peripheral portion and connections between said portions, a non-rotatable axle receiving tube extending into said gear receiving portion, a gear carrier fixed at the outer end of said axle receiving tube, a driven shaft extending within said axle receiving tube, anti-friction bearings interposed between said axle receiving tube and said gear receiving hub portion for supporting the wheel on said axle receiving tube independently of said driven shaft, a driving pinion disposed within said gear receiving portion and on said driven shaft, an internal gear carried by said gear receiving portion in the plane of said pinion, and an idler gear carried by said gear carrier, interposed between said pinion and internal gear and meshing therewith, the mounting of said gear receiving portion on said non-rotatable axle receiving tube being substantially dust proof and lubricant tight.

7. In power transmitting mechanism of the class described, a traction wheel having an enlarged gear receiving section at its center, a peripheral section and connections between said sections, a non-rotatable axle receiving section extending into said gear receiving section and having a gear cage fixed at its outer end and disposed within said gear receiving section, anti-friction bearings for mounting said gear receiving section thereon and placing the load and thrust strains and stresses of said wheel on said axle receiving section, a driven shaft extending through said axle receiving section, reduction gearing disposed in said enlarged gear receiving section for transmitting power thereto from the outer end of said driven shaft and including a driving pinion, an idler gear, and an internal gear, and a supporting bearing for the outer end of said driven shaft carried by said gear cage, the mounting of said gear receiving section on said non-rotatable axle receiving section being substantially dust proof and lubricant tight.

8. In combination, a traction wheel having a peripheral section, a centrally disposed gear receiving and hub section disposed in the plane of said peripheral section, and a connection between said sections, an internal gear rigidly secured within said gear receiving section, a combined gear carrier and hub support comprising a gear carrier disposed in the plane of said internal gear and a reduced tubular section rigidly secured thereto and extending inwardly beyond the inner end of the hub, anti-friction load and thrust bearings interposed between said hub section and said gear carrier and hub support, a driven shaft rotatably arranged within said gear carrier and hub support, a driving pinion carried by said driven shaft in the plane of said internal gear, and an idler carried by said gear carrier and meshing with said driving pinion and internal gear, the mounting of said gear receiving section on said combined gear carrier and hub support being substantially dust proof and lubricant tight.

9. In power transmitting mechanism of the class described, the combination of a non-rotatable tubular axle section, a driven shaft extending therethrough, a traction wheel having a peripheral section, a centrally disposed gear receiving and hub section and a connection between said sections, anti-friction bearings for mounting said gear receiving and hub section thereon and disposed at the outer end of said tubular section, said gear receiving and hub section being held against movement axially inwardly relative to said tubular section beyond a fixed point, a gear carrier rigidly and detachably secured to the outer end of said tubular section and disposed to hold said anti-friction bearings against axial movement outwardly, and reduction gearing carried by said wheel hub, gear carrier and the outer end of said driven shaft, the mounting of said gear receiving and hub section on said axle section being substantially dust proof and lubricant tight.

10. In combination, a traction wheel having a peripheral portion, oppositely dished plates forming a combined gear receiving and hub portion in the plane of the rim of said wheel, and a connection from one of said plates only to said peripheral portion for rotating the latter, an internal gear rigidly and detachably secured in said gear receiving and hub portion, a combined rigid gear carrier and hub support comprising a carrier for an idler gear disposed in the plane of said internal gear and a reduced tubular section extending inwardly beyond the inner end of the hub portion, anti-friction bearings interposed between said gear receiving and hub portion of the wheel and said gear carrier and hub support, a driven shaft rotatably arranged within said gear carrier and hub support, a driving pinion carried by said driven shaft in the plane of said internal gear, and an idler gear carried by said gear carrier and meshing with said driving pinion and internal gear.

11. In combination, a traction wheel having a peripheral portion, oppositely dished plates forming a combined gear receiving and hub portion in the plane of the rim of said wheel and means integrally formed with one of said dished plates for connecting said gear receiving and hub portion to said peripheral portion, an internal gear rigidly and detachably secured within said hub portion, a rigid gear carrier and wheel support comprising a carrier for an idler gear disposed in the plane of said internal gear and a reduced tubular section extending inwardly beyond the inner end of said gear receiving section, anti-friction bearings for mounting said gear receiving section on said gear carrier and wheel support, a driven shaft rotatably arranged within said gear carrier and wheel support, a driving pinion carried by said driven shaft in the plane of said internal gear, and an idler gear carried by said gear carrier and meshing with said driving pinion and internal gear.

12. In power transmitting mechanism of the class described, the combination of a non-rotatable tubular axle section, a driven shaft extending therethrough, a traction wheel having a hub provided with a gear receiving casing, said hub being mounted upon the outer end of said tubular section to turn freely thereon, a gear carrying element rigidly and detachably secured to said tubular section, reduction gearing disposed within the gear casing in said hub and interposed between said hub, the gear carrying element and driven shaft therein, and including a driving pinion, an idler gear and an internal gear, said gear carrying element being removable by endwise displacement without disturbing the mounting of the adjacent wheel hub.

13. In traction mechanism, the combination of a non-rotatable axle tube, a gear cage which is fixed to the outer end thereof, a rotatable axle shaft extending through said axle tube, a pinion fixed to said axle shaft within said gear cage, an anti-friction bearing mounted in said gear cage nearer the outer end thereof than said pinion for supporting the said axle shaft, an idler gear mounted in said gear cage in mesh with said pinion, a traction wheel having a centrally disposed chamber formed of two oppositely dished plates, one of which is provided with a cylindrical flange at its margin, an internal ring gear which fits within said flange and between the inside and outside dished plates, means to firmly secure together said ring gear and two plates, and anti-friction bearings for supporting said traction wheel rotatably with respect to said axle tube and gear cage and independently of said axle shaft.

14. In traction mechanism, the combination of a non-rotatable axle tube, a gear cage which is fixed to the outer end thereof, a rotatable axle shaft extending through said axle tube, a pinion fixed to said axle shaft within said gear cage, an anti-friction bearing mounted in said gear cage nearer the outer end thereof than said pinion for supporting said axle shaft, an idler gear mounted in said gear cage in mesh with said pinion, a traction wheel formed with a dished inner wall or plate having at its outer margin an annular, cylindrical flange, an oppositely dished outside plate, an internal ring gear which fits within said cylindrical flange and between said plates, means to firmly secure together said ring gear and two plates, and anti-friction bearings for supporting said traction wheel rotatably with respect to said axle tube and gear cage and independently of said axle shaft.

15. In traction mechanism, the combination of a traction wheel comprising two pieces, namely, one piece having a centrally dished plate, an integral flange at the margin of said plate, and spokes which are integral with said flange, and the other piece of the wheel being a plate which is oppositely dished, an internal ring gear which is fitted within said flange and is clamped between the two dished plates near their marginal edges, an axle tube which passes into a hole in the inner dished plate and into the central chamber between said dished plates, a gear cage fixed to said axle tube within said chamber, anti-friction bearings for supporting said traction wheel rotatably with respect to said axle tube and gear cage, an axle shaft which projects through said axle tube into said wheel chamber, a pinion fixed to said axle shaft within the gear cage, an anti-friction bearing for said axle shaft supported by said gear cage, and an intermediate gear rotatably mounted upon said gear cage and in mesh with said pinion and internal ring gear.

16. In traction mechanism, the combination of a traction wheel including two pieces, namely, one piece having a centrally dished plate, an integral flange at the margin of said plate, and spokes which are integral with said flange, and the other piece of the wheel being a plate which is oppositely dished, an internal ring gear which is fitted within said flange and is clamped between the two dished plates near their marginal edges, an axle tube which passes into a hole in the inner dished plate and into the central chamber between said dished plates, a gear cage fixed to said axle tube within said chamber, anti-friction bearings for supporting said traction wheel rotatably with respect to said axle tube and gear cage, an axle shaft which projects through said axle tube into said wheel chamber, a pinion fixed to said axle shaft within the gear cage, and an intermediate gear rotatably mounted upon said gear cage and in mesh with said pinion and internal ring gear.

17. In traction mechanism of the class described, the combination of a hollow axle frame member having a portion which serves as a gear housing, two alined non-rotatable axle tubes which extend in opposite directions from said gear housing, a gear cage rigid with the outer end of each axle tube, differential mechanism mounted within said gear housing on the walls thereof, and, associated with each axle tube, a traction wheel rotatably supported by said axle frame member with respect to said gear cage and with its rim in the plane of said gear cage, an axle shaft having telescopic driving connection at its inner end with said differential mechanism, a driven pinion on the outer end of said axle shaft in said gear cage, an idler gear mounted in said gear cage and in mesh with said driving pinion, an internal gear in mesh with said idler gear, and carried by the hub of said traction wheel, and a removable hub plate for said traction wheel in line with said axle shaft, said hub plate being of a greater diameter than said gear cage and the idler gear carried thereby.

18. In a driving axle of the class described, the combination of a non-rotatable axle tube, a gear cage fixedly carried by the outer end of said axle tube, a rotatable axle shaft extending out through said axle tube and into said gear cage, a pinion fixed to said axle shaft within said gear cage, an annular ball bearing in said gear cage by which the outer end of said axle shaft is supported, an idler gear mounted in said gear cage in mesh with said pinion, a traction wheel formed with a dished plate having at its outer margin an annular cylindrical flange and outside of that the outer portion of the wheel, and an oppositely dished plate, an internal ring gear which fits within said cylindrical flange and between said dished plates, means to firmly secure together said ring gear and two plates, and anti-friction bearings for mounting said traction wheel rotatably with respect to said gear cage and independently of said axle shaft.

19. In a driving axle of the class described, the combination of a non-rotatable axle tube, a gear cage fixed to the outer end of said axle tube, a rotatable shaft extending out of said axle tube and into said gear cage, a pinion fixed to said axle shaft within said gear cage, an anti-friction bearing supported by said gear cage and applied to said axle shaft for supporting the same near its outer end, an idler gear mounted in said gear cage in mesh with said pinion, a traction wheel whose center part comprises two oppositely dished plates disposed in the plane of the rim of the wheel and which are separably secured together near their margin, anti-friction bearings for rotatably supporting said traction wheel with respect to said gear cage and independently of said axle shaft, one of said wheel plates being provided at its outer margin with a cylindrical flange and having wheel spokes integral with said flange, a ring gear which is fitted in said cylindrical flange and between said plates, and means to firmly secure together said ring gear and two plates.

20. In a driving axle of the class described, the combination of a hollow axle frame member having a centrally placed differential housing and two alined axle tubes which respectively project from said housing in opposite directions, and associated with each of said tubes and rigidly connected thereto a gear cage, a traction wheel whose middle part is formed of two oppositely dished plates which are connected together to form a central chamber, disposed in the plane of the rim of the wheel and inclosing said gear cage, one of said plates being formed at its margin with a cylindrical flange and with integrally formed spokes extending outward from said flange, a ring gear fitted within said cylindrical flange between the two dished plates, means connecting together said two dished plates and ring gear, an axle shaft which extends through said axle tube, and gearing in said central chamber for transmitting motion from said axle shaft to said traction wheel.

21. In power transmitting mechanism, the combination of a non-rotatable tubular axle section, a driven shaft extending through said tubular section and beyond the outer end of the latter, a traction wheel having a hub provided with a gear receiving casing, anti-friction bearings for the mounting of said hub thereon and disposed near the outer end of said tubular section, a gear cage disposed in said casing and rigidly secured to said tubular section nearer the outer end thereof than said anti-friction bearings thereon, and comprising inner and outer plates and stud shafts secured between said plates, idler gears each arranged on said stud shafts, a gear carried at the outer end of said driven shaft and meshing with the said idler gears, and an internal gear carried by said traction wheel and meshing with said idler gears.

22. In power transmitting mechanism, the combination of a non-rotatable tubular axle section, a driven shaft extending therethrough, a traction wheel having a hub provided with a gear casing mounted on the outer end of said axle section and held against axial movement inwardly thereon beyond a fixed point, a gear cage detachably secured to the outer end of said tubular section and serving to hold said wheel hub against outward axial movement, said gear cage comprising inner and outer plates and stud shafts connecting them together, the outer end of said driven shaft having a bearing in the outer plate of said gear cage, a driving gear carried by said driven shaft within said gear cage, idler gears mounted on said stud shafts and meshing with said driving gear, and an internal gear meshing with said idler gears and connected with the hub of said wheel, whereby removal of said outer plate will permit removal of said idler gears without disturbing the mounting of said wheel hub.

23. In power transmitting mechanism, the combination of a non-rotatable tubular section, a driven shaft extending therethrough, a wheel hub mounted upon said tubular section and held thereon against inward axial movement beyond a predetermined point, a substantially dust and lubricant tight closure between the inner end of said hub and said tubular section, said hub having at its outer end a flange, an internal gear and end plate bolted to said flange to form therewith a substantially dust proof and lubricant tight gear casing, a gear cage secured to the outer end of said tubular section within said gear casing and serving to prevent the outward axial movement of said hub relative to said tubular extension, a driving gear carried by said driven shaft and disposed within said gear cage in the plane of said internal gear, and idler gears carried by said gear cage and interposed between said driving gear and said internal gear.

24. In power transmitting mechanism, the combination of a non-rotatable tubular axle section, a driven shaft extending therethrough, a traction wheel having a hub mounted to turn upon the outer end of said tubular section and held against movement axially inwardly relatively thereto, beyond a fixed point, a gear cage comprising inner and outer plates and stud shafts spacing and detachably connecting said plates together, the inner one thereof being rigidly secured to the outer end of said tubular section, idler gears mounted on said stud shafts, a driven gear carried by the outer end of said driven shaft and meshing with said idler gears, and an internal gear connected with the wheel hub and meshing with said idler gears whereby the idler gears and driven shaft, either or both, may be removed by detaching the outer plate of said gear cage.

In testimony whereof I affix my signature.

LEO MELANOWSKI.

Witness:
 Geo. B. Pitts.